United States Patent Office 3,361,761
Patented Jan. 2, 1968

3,361,761
ECONOMIC PROCESS FOR SYNTHESIS OF SULFUR COMPOUNDS
Harry E. Gunning, Edmonton, Alberta, Canada, assignor to Imperial Oil Limited, a corporation of Canada
No Drawing. Filed Sept. 18, 1963, Ser. No. 309,844
9 Claims. (Cl. 260—327)

ABSTRACT OF THE DISCLOSURE

This invention relates to the preparation of episulfides and other cyclic sulfides by reacting monoolefins, polyolefins, or acetylenes with $H_2S$ at temperatures of 250 to 260° C. in the presence of a catalyst having a non-acidic surface which promotes the overall stoichiometric reaction on the catalyst surface: $H_2S \rightarrow H_2+S$, e.g., tungsten, platinum group metals, thiosulfates, etc.

---

The present invention relates to economic processes for selectively converting inexpensive olefinic or acetylenic feeds directly too difficult to synthesize episulfides and other cyclic sulfides. More particularly this invention relates to reacting hydrogen sulfide with compounds containing olefinic or acetylenic bonds in the gas phase at gas phase temperatures of 250–650° C. in the presence of specific catalysts which promote decomposition of the hydrogen sulfide into molecular hydrogen and atomic sulfur. Most particularly, in a preferred embodiment, this invention relates to carrying out these reactions in a flow reactor designed to prevent backmixing, i.e. to minimize thermal degradation of final products formed in the reaction and to prevent formation from the hydrogen sulfide of active intermediates other than monatomic sulfur which would increase yields of undesired mercaptans.

The present invention will be more clearly understood from a consideration of the following chemical equations which present the general mechanism as it is now understood of the present reactions (in each case the R's are H, alkyl, or aryl groups and the same results are obtained where two R's are joined to obtain a cyclic compound)

(A) Desired formation of monatomic sulfur:

$$H_2S \xrightarrow[\Delta]{\text{on special catalyst}} H_2+S$$

(B) Undesired formation of active materials other than monatomic sulfur (produces e.g. mercaptans as final product):

$$H_2S \xrightarrow[\Delta]{\text{without special catalyst}} H+HS$$

(C) Reaction of monatomic sulfur with monoolefins:

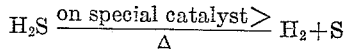

(D) Reaction of monatomic sulfur with non-conjugated diolefins:

$$S + R'-CH=CH-(CH_2)_n-CH=CH-R'' \longrightarrow$$

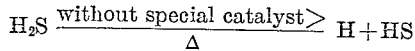

(E) Reaction of monatomic sulfur with conjugated diolefins:

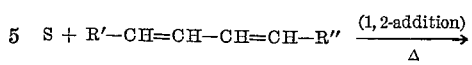

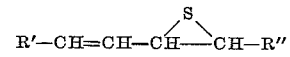

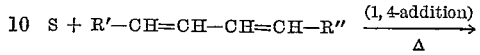

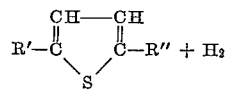

(F) Reaction of monatomic sulfur with acetylenic compounds:

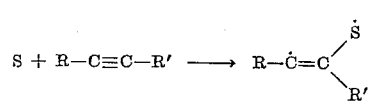

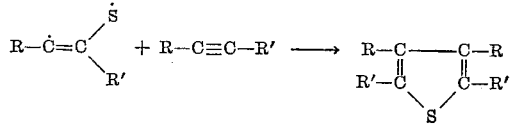

In the above reactions the catalyst functions to remove the two H atoms from the $H_2S$ molecules, and these two hydrogen atoms recombine on the surface of the catalyst, and at the same time the S atom is released to the gas phase to react with the olefin or acetylene. Under such conditions the reaction is partially thermally self-sustaining owing to the heat supplied by the recombination of the hydrogen atoms on the surface of the catalyst. Thus, when a mixture of propylene and hydrogen sulfide in a mole ratio of 2:1 is flowed through any unpacked reactor at ca. 350°, no measurable reaction can be detected at flow rates of say 2 millimoles per $cm.^2$ per minute. If, however, the reactor contains e.g. plasticized tungsten wire, the wire is observed to glow red, owing presumably to the recombination of H atoms, and with all other conditions the same as in the aforementioned sterile run, the products of the reaction are 50% propylene sulfide, 26% n- and iso-propyl mercaptan and the remainder, carbon disulfide and an as yet unidentified material.

Preferred catalysts are solid catalysts having a non-acidic surface, e.g. plasticized tungsten, platinum, palladium, iridium, silver, gold, tantalum, ruthenium, rhodium, niobium, and mixtures of these all of which may be present on standard non-acidic supports such as asbestos; solid thiosulfates of the alkali and alkaline earth metals, tungsten carbide, the above metal carbides, high carbon steels i.e. containing 0.1 to 5%, preferably 0.1 to 1 wt. percent carbon and any other non-acidic catalytic surfaces which promote the over-all stoichiometric reaction on the catalyst surface: $H_2S=H_2+S$. This may be accomplished by any of the following processes singly or in combination:

(A) Recombination of H atoms to form $H_2$;
(B) Decomposition of HS to form H+S;
(C) Continuous S exchange between $H_2S$ and catalyst surface i.e.

$$H_2S' + Ag_2S'' \longrightarrow H_2 + Ag_2S' + S''$$
$$H_2S' + S''_2O_3{=} \longrightarrow H_2 + S'_2O_3{=} + S''$$

Prior art has demonstrated that acidic catalysts, i.e. $Al_2O_3$ promotes release to the gas phase of $H+HS$. Particularly preferred are plasticized tungsten containing 0.01 to 5% carbon, free platinum, palladium and silver. Preferably the catalysts have high surface areas in the range of 10 to 500 meters$^2$/gm., preferably 100 to 500 $M^2$/gm. (of the active material e.g. metal).

Suitable feed stocks for use in the present invention are unsaturated organic feeds, preferably gaseous feeds or feeds capable of being converted to a gas without decomposition.

(a) $C_2$ to $C_{12}$ preferably $C_2$ to $C_9$ branched and straight chain monoolefins including those containing other functional groups such as aryl groups, carboxyl groups, chlorine, fluorine, etc. e.g. ethylene, propylene, isobutylene, 1-butene, 2-butene, 2-methyl-1-butene, pentenes, hexenes, heptenes, dodecenes, styrene, oleic acid, etc.

(b) Same range for cyclic monoolefins and substituted cyclic monoolefins, and alkyl aryl, carboxyl, chlorine and fluorine substituted cyclic monoolefins, beginning with $C_3$ ring, e.g. cyclobutene, cyclopentene, cyclohexene, cycloheptene, cyclooctene, alkyl substituted derivatives thereof, cyclopentanoic acid, cyclohexenoic acids, cinnamic acids, etc.

(c) Same range for branched and straight chain unconjugated diolefins and alkyl, aryl, carboxyl, chlorine and fluorine substituted unconjugated diolefins beginning with $C_3$ (allene) e.g. 1–4 pentadiene, 1–5 hexadiene, etc.

(d) Same range for conjugated diolefins, branched and straight chain, and alkyl, aryl, carboxyl, chlorine and fluorine substituted conjugated diolefins beginning with $C_4$, e.g. 1–3 butadiene, isoprene, chloroprene, etc.

(e) Same range for conjugated and unconjugated cyclic diolefins and alkyl, aryl, carboxyl, chlorine and fluorine substituted cyclic diolefins beginning with $C_4$ ring, e.g. cyclobutadienes, cyclopentadienes, cyclohexadienes, cyclohexadienoic acids, cycloheptadienes and cyclooctadienes.

(f) Same range for non-cylic and cyclictriolefins and substituted triolefins including as substituents alkyl groups, aryl groups, carboxyl groups, chlorine, fluorine, etc. beginning with $C_6$, e.g. cycloheptatrienes, cyclooctatrienes, 1,3,5-hexatriene, heptatrienes, etc.

(g) Same range for other non-hydrocarbon feeds including fatty acids, furan, thiophene, 1,4-pyrone, alkyl- and aryl-substituted thiophenes, unsaturated alcohols, i.e. allyl alcohol, etc.

(h) Same range for branched and straight chain acetylenes, e.g., acetylenes.

The present invention may be carried out under the following preferred conditions:

(1) Gas temperatures at which the vapor pressure of the olefinic or acetylenic compound is at least 10 mm., preferably in the range, 250 to 650° C., more preferably 300 to 500° C.

(2) Pressures in the range of 0.01 to 100 atmospheres, preferably 0.01 to 10 atmospheres, i.e. one atmosphere.

(3) Reaction times in the range of 1 second to 10 hours, preferably 0.1 min. to one hour, more preferably 0.1 to 20 min.

(4) Mole ratios of olefin or acetylene to $H_2S$ in the range of 0.1 to 50:1, preferably 1 to 10:1, more preferably 1 to 5:1.

(5) Flow rates of 1 to 1000 millimoles per cm.$^2$ of reactor cross section per minute, preferably 1 to 100 millimoles per cm.$^2$ per minute.

(6) Flow rates per weight of catalyst 5 to 1000, preferably 25 to 100 micromoles of olefin or acetylene converted per gram of catalyst per minute. In an especially preferred embodiment, the reaction is carried out with plasticized tungsten and free platinum, palladium, rhodium, iridium, and ruthenium having catalyst surface temperature preferably at least 100° C. above the temperature of the gas, preferably surface temperatures of 350 to 1000° C., more preferably 700 to 1000° C.

In a preferred embodiment, the reaction is carried out in a flow reactor having a L/D of 3:1 to 25:1 at reaction times of 1 second to 10 minutes. Also, in a preferred embodiment conditions to obtain low conversions per pass, e.g. 1–10% are utilized and desired products, e.g. episulfides are removed from the product by absorption, extraction, etc. and the remaining reaction products are recycled to extinction to thereby obtain high over-all conversions and yields.

This invention will be more clearly understood by consideration of the following examples.

*Example 1*

A Pyrex, tubular reaction vessel, with a volume of 80 cc., was loosely packed with 50 grams of plasticized tungsten wire (18 gauge), and glass wool retainers and heated to 400° C. Propylene and hydrogen sulfide in a 3:1 ratio at a total pressure of 400 mm. were fed directly into the vessel from tanks, through individual flowmeters. The reaction vessel had a cross section of ca. 5 cm.$^2$. When the flow rate through the vessel exceeded 7 millimoles per minute the products of the reaction were 50% propylene sulfide, 25% propyl mercaptan (n and iso), 5% carbon disulfide and remainder at present unidentified. At flow rates less than the aforementioned minimum, the total yields fell rapidly to small values. The n-propyl mercaptan and ispropyl mercaptan were found to be present in equal yields. In the absence of the catalyst, no measurable reaction could be detected.

*Example 2*

The same reactor and other equipment described in Example 1 were utilized under the following conditions:

Flow rate=5.0 millimoles per minute
P total=400 mm.
$C_3H_6/H_2S$ ratio=3/1
Temperature=450° C.
Catalyst=50 grams plasticized tungsten wire (18 gauge) loosely packed in reactor without glass wool retainers, i.e. only the lower one-third of reactor filled because of lack of larger supply.

|  | 1 min. | 2 min. | 3 min. |
|---|---|---|---|
| Condensable, micromoles | 6.0 | 12.0 | 18.0 |
| Non-condensable, micromoles | 6.5 | 13.0 | [1] 20.0 |

[1] 98% $H_2$.

The presence of the stoichiometric amount of hydrogen formed indicates that no propylene was hydrogenated. It is noted that 18 micromoles is about 0.5% conversion. The product distribution (condensables) was as described in Example 1. Similar results were obtained with silver, platinum and sodium thiosulfate catalysts.

What is claimed is:

1. A process for preparing organic sulfur compounds which comprises reacting in the vapor phase an organic material selected from the group consisting of $C_2$ to $C_{12}$ monoolefins and polyolefins, $C_2$ to $C_{12}$ acetylenes and aryl, carboxyl, fluorine and chlorine substituted $C_2$ to $C_{12}$ monoolefins and polyolefins containing no more than one such substitution per double bond carbon atom group, with $H_2S$ at temperatures in the range of 250° C. to 650° C. in the presence of catalyst selected from the group consisting of platinum, palladium, rhodium, niobium, titanium, zirconium and mixtures of these materials, solid thiosulfates of the alkali and alkaline earth metals and tungsten carbide and recovering from the reaction products a material selected from the group consisting of episulfides and thiophenes.

2. The process of claim 1 in which the organic material reacted is ethylene.

3. The process of claim 1 in which the organic material reacted is propylene.

4. The process of claim 1 in which the organic material reacted is butene-1.

5. The process of claim 1 in which the organic material reacted is butene-2.

6. The process of claim 1 in which the organic material reacted is isobutylene.

7. The process of claim 1 in which the reaction is carried out at temperatures in the range of 300° to 500° C.

8. The process of claim 1 in which the temperature of the surface of the catalyst is 700° to 1000° C.

9. The process of claim 8 in which the reaction is carried out under flow conditions at pressures of 0.1 to 10 atmospheres with residence times in the range of 0.01 minutes to 1 hour.

References Cited
UNITED STATES PATENTS 2,591,710  4/1952  McCleary et al. _____ 260—329

JAMES A. PATTEN, *Primary Examiner.*

WALTER A. MODANCE, *Examiner.*